United States Patent Office 3,424,104
Patented Jan. 28, 1969

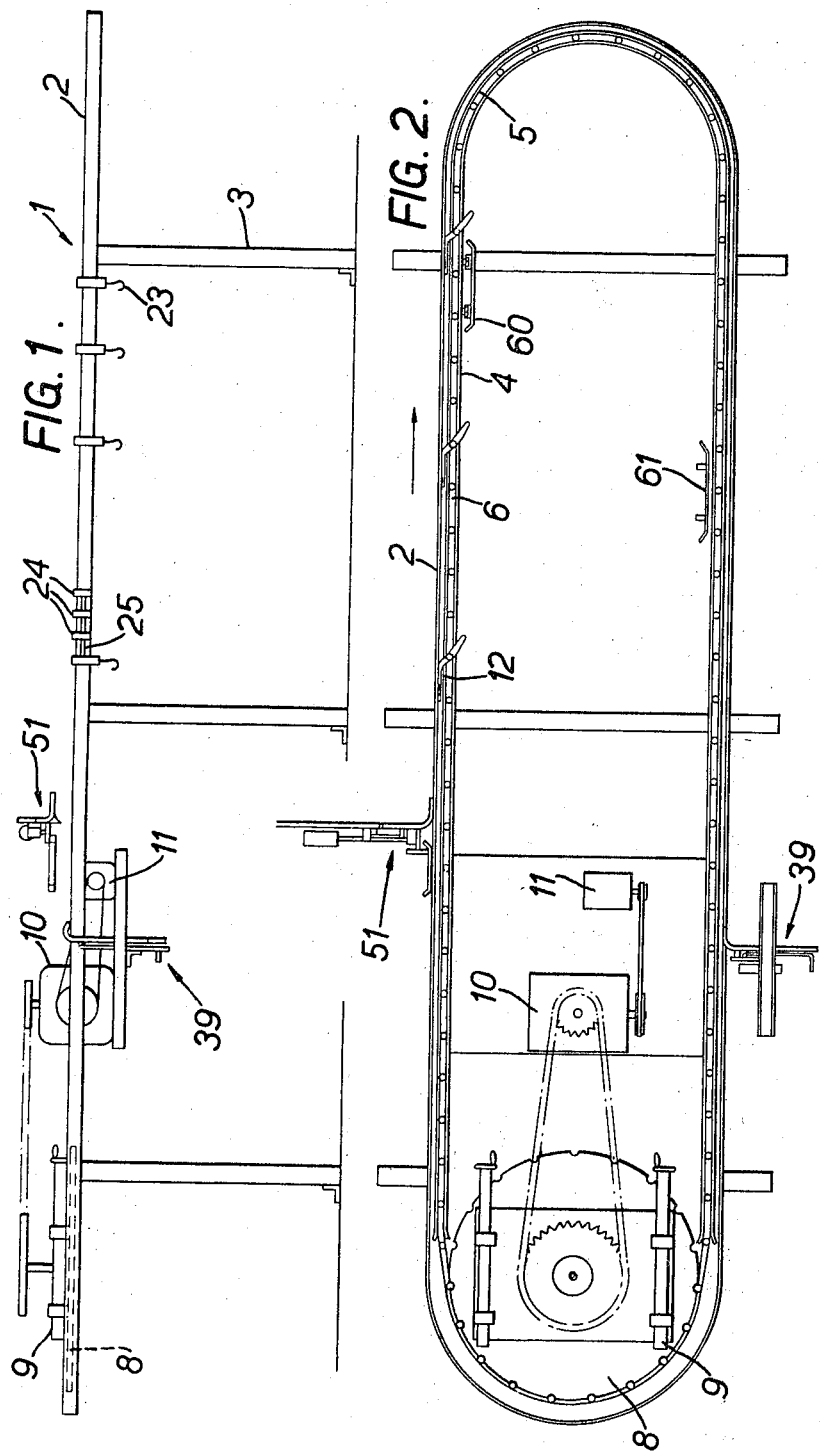

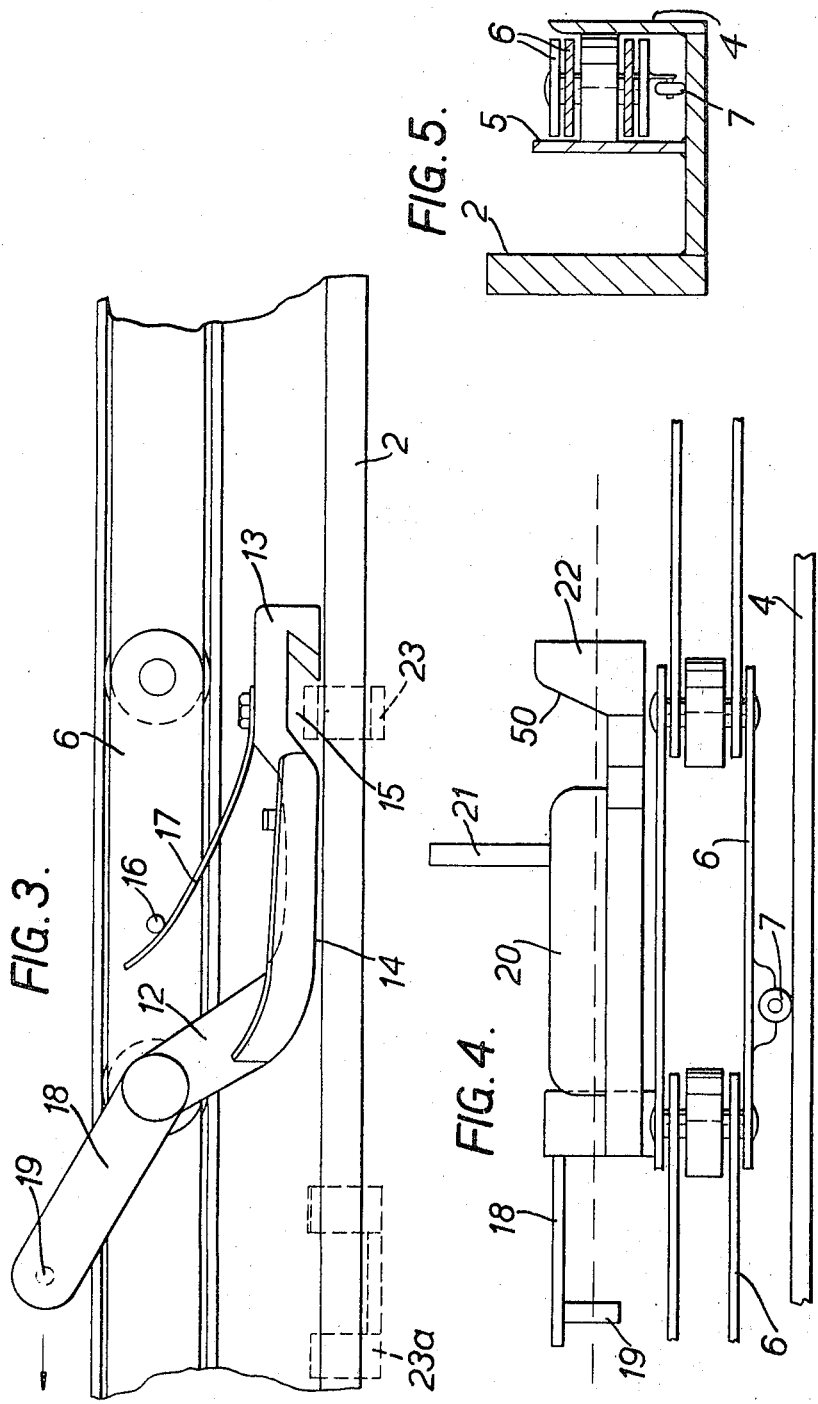

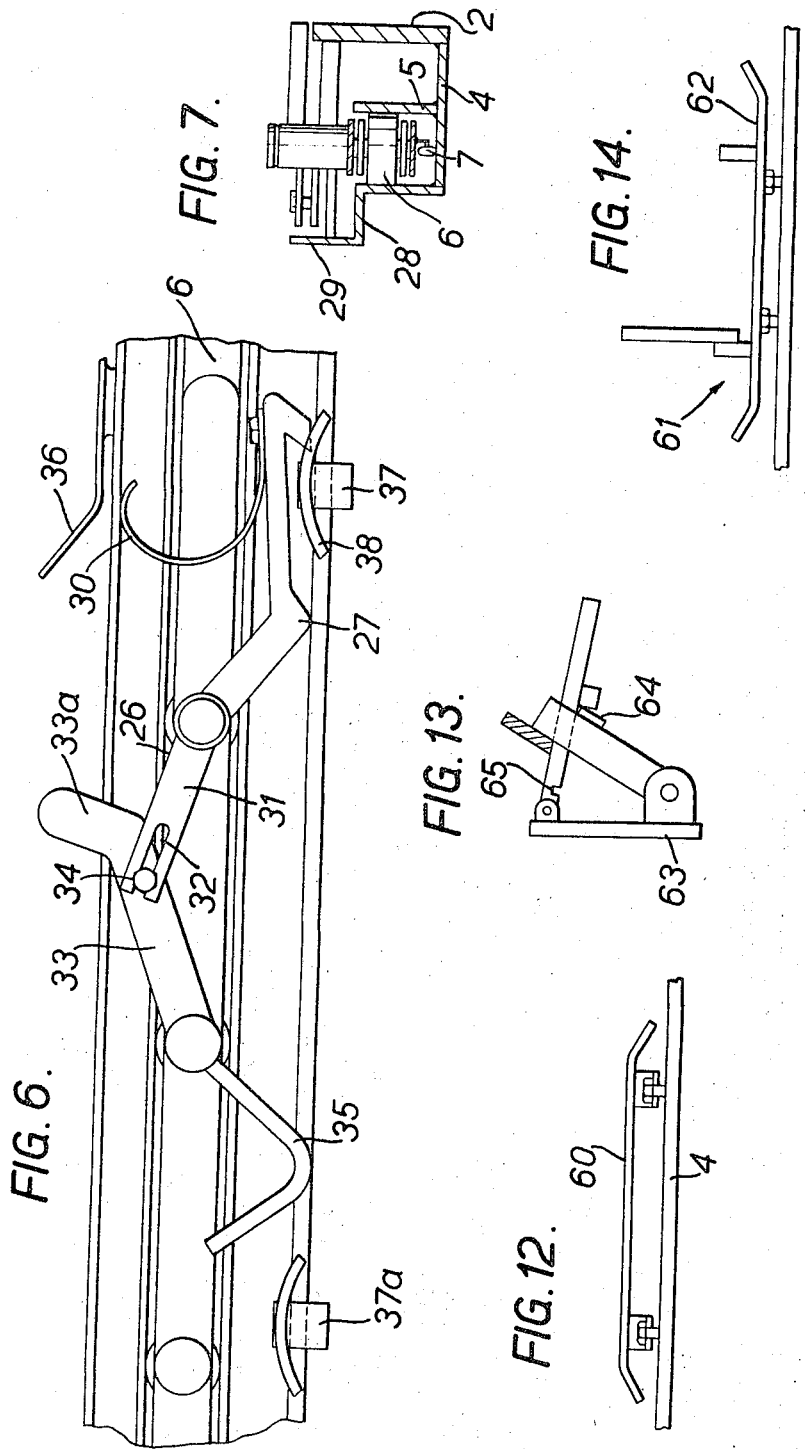

3,424,104
CONVEYOR APPARATUS
Colin James Allen, 1 Turner St., Dunedin,
Otago, New Zealand
Filed Aug. 10, 1966, Ser. No. 571,535
Claims priority, application New Zealand, Aug. 13, 1965,
142,611
U.S. Cl. 104—172    10 Claims
Int. Cl. B61b 9/00, 13/00; B61j 3/00

ABSTRACT OF THE DISCLOSURE

A conveyor for a carrier along a path by driving members fixed to an endless drive positioned on one side of the path with such members arranged to be released by a release station positioned on the side of the drive remote from the path. The driving members include a release mechanism operable selectively to release and marshal subsequent carriers moved about the path with the marshalled carriers remaining in the stationary position until the leading carrier moves past the station whereupon the second carrier advances to the station and subsequent carriers caused to advance while maintaining the selected spacing therebetween the carrier stopped at the station.

---

This invention relates to conveyor apparatus.

There are a large number of conveyor systems at present available but one of the problems in such systems is to provide a means of disengageable drives which will enable the carriers being moved along the conveyor path to be marshalled or stacked one behind the other so that the article may be treated, removed from the carrier or another carrier introduced into the system.

It is an object of the present invention to provide a conveyor apparatus which will allow for selective marshalling of carriers on the conveyor without requiring the driving members to be stopped.

Also it is frequently desirable to have a conveyor system which will accommodate different sizes of articles either as a series run of the larger articles or with varying sizes of articles being conveyed along the conveyor at one time.

It is a further object of the invention to provide conveyor apparatus for selectively marshalling the carriers so that the spacing may be adjusted to compensate for the size of the articles being carried.

It is a still further object of the present invention to allow articles to be introduced on to the main conveyor rail and removed from the conveyor rail with a minimum of effort and again without interrupting the driving means on the main conveyor rail.

Figure 8:
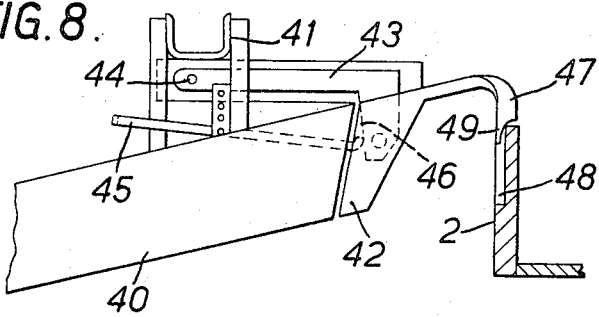
Figure 9:
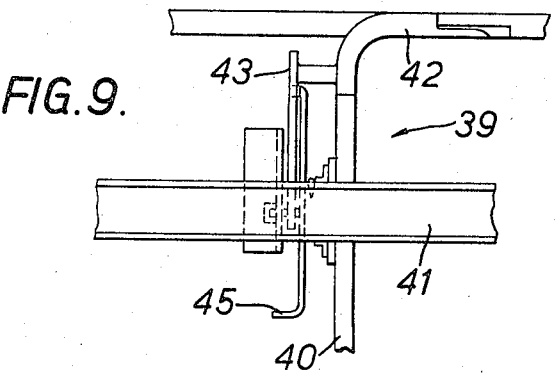
Figure 10:
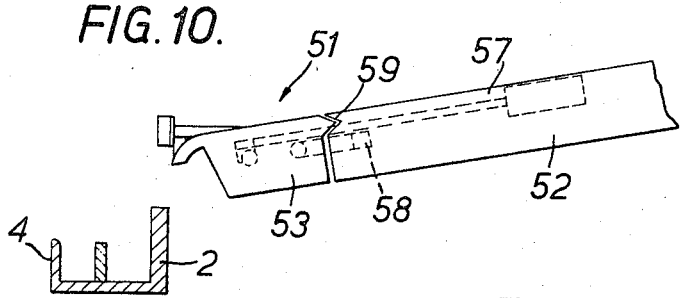
Figure 11:
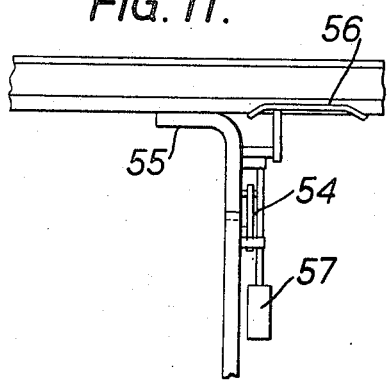

These and other objects will be disclosed in the preferred form of the apparatus and modification thereof disclosed with reference to the accompanying drawings in which:

FIGURE 1 is a side elevation of conveyor apparatus according to the present invention,
FIGURE 2 is a plan view of FIGURE 1,
FIGURE 3 is a detailed plan view of one form of driving member,
FIGURE 4 is a side elevation of FIGURE 3 with parts of the conveyor rail omitted,
FIGURE 5 is a section through the conveyor rail,
FIGURE 6 is a plan view of an alternative form of driving member,
FIGURE 7 is a sectional view through the rail and driving member as shown in FIGURE 6,
FIGURE 8 is a side elevation of a feed-off switch,
FIGURE 9 is a plan view of FIGURE 8,
FIGURE 10 is a side view of a feed-on switch,
FIGURE 11 is a plan view of FIGURE 10,
FIGURE 12 is a detail of a fixed drive station,
FIGURE 13 is a part sectional view of a release station, and
FIGURE 14 is a plan view of a release station.

In the preferred form of the invention a conveyor system 1 comprises a main conveyor rail 2 which is preferably formed in a continuous path, for example shown with two straight sides and radiused ends. This of course may be varied depending upon the particular requirements of the conveying system and the present illustrations are by way of example only. Any suitable stand may be provided with uprights 3 to support the rail 2 above the ground. Alternatively in certain installations the rail may be mounted at ground or table top level or suspended from above. The rail 2 preferably comprises a rectangular metal member, for example a three inch by a half inch member, with one of the shorter sides used as the bearing surface. Fixed to the inner side of the rail 2 is an angle member 4, for example a two by three inch angle having an intermediate member 5 extending centrally from the base thereof. The space defined by the intermediate member 5 and the outer wall of the angle 4 is arranged to support an endless roller chain 6 to provide the drive means. The chain is modified by attaching small wheels or bearing means 7 to the underneath of the chain to give vertical support. If desired a suitable wire rope could replace the chain as the drive means.

Towards one end of the conveyor system a drive wheel 8 is provided arranged to receive the chain 6. Over this section the members extending in from rail 2 are omitted. The wheel 8 is suitably supported preferably on a frame carried on adjustment arms 9 with a drive provided and through a reduction box 10 to a motor 11.

Attached to the chain 6 at given intervals are drive members 12. Only three such drive members are shown in FIGURE 2 of the drawings, but of course these members could and normally would be evenly spaced around the chain.

The drive member 12 is shown in more detail in FIGURES 3 and 4. A propelling part or pulling dog 13 adapted to engage with a carrier is pivoted from one of the links in the chain and is arranged to extend across the space between the rail 2 and the central member 5 so that the forward edge of the dog 13 abuts against the side of the rail 2, just below the top of the rail. The dog is shaped so that a leading section 14 is positioned to move adjacent the rail 2 with a holding space 15 being left immediately prior to the engaging part of the dog. The portion 14 provides part of the abutment means which will engage with a part of a preceding carrier on the conveyor rail and cause the driving member to move out of engagement with the carrier it is pulling. A pin 16 protrudes from the chain on a link following the pivotal mounting of the pulling dog 13, and a biasing spring 17 extends from the forward part of the pulling dog 13 to pass about the spring 16. This spring in use operates to move the pulling dog back to a position abutting the inner face of the rail 2.

Extending out in the opposite direction to the pulling dog 13 is a control arm 18 which projects forwardly slightly and has the end extending over the upturned side of the angle 4. A pin 19 is dependent from the arm 18 and in use may also control the operation of the driving member 12.

Extending upwardly from the front face of the portion 14 of the dog 13 is a release plate 20 and arm 21 arranged in use to assist in controlling the introduction of additional carriers on to the conveyor rail as will be described in detail later. Finally an upstand 22 protruding above the engaging part of the dog 13 is provided to assist in delivering a carrier on to a feed-off rail. This also will be described in greater detail later.

The present invention has a wide variety of applications and accordingly the carriers which can be mounted on the rail 2 may vary depending upon the particular article to be conveyed about the conveyor rail. One particular use for a conveyor of this type is in the meat industry in freezing works where the carriers are the skids 23 normally used to support a meat carcass. A skid 23 in dotted outline is shown in engagement with the dog 13 in FIGURE 3 and a further carrier skid 23a is also shown in dotted outline a little further advanced along the rail 2.

When articles are being conveyed about a conveying path, it is desirable to be able to marshal the carriers supporting the articles selectively so that the articles may be marshalled or stacked along the conveyor rail, for example at a treatment station or if there is any delay about the conveying path, with the distance between the carriers dictated by the size of the article being supported. To this end a normal load bearing carrier has a number of dummy carriers 24 extending rearwardly therefrom with the dummy carriers connected one to the other and with the front dummy carrier connected to the load bearing carrier by links 25. Thus the dummy carriers and spacing links provide a spacing means which will control the distance between the stacked or marshalled carriers on a conveyor rail. Preferably the dummy carriers and links are readily interconnected so that the desired number of dummy carriers may be associated with each load bearing carrier quickly and easily to ensure that sufficient space is provided to prevent the articles supported by the load bearing carrier being bumped by a following article on the conveyor path. Of course the spacing of the links and dummy carriers is such that the driving dog 13 is moved to the disengaged position by the dummy carriers coacting with the abutment portion and may only return to engage with the leading or load bearing carrier.

This could also be achieved by having the dummy carrier of a width such that it will not fit into the gap 15. The dummy carrier will thus act as a release means to cause the driving dog to release any carrier but because of the width of the dummy carrier the driving dog cannot re-engage with the dummy carrier and will only engage with the load bearing carrier. The spacing links with this construction could be of any distance to give the required spacing.

A modified form of driving member 26 is illustrated in FIGURES 6 and 7 of the accompanying drawings. A pulling dog 27 is pivotally attached to the chain 6 in a similar manner to that previously described. In this case the rail is modified including an extension L-shaped member 28 extending out from the side of the angle member 4 with the upstanding portion 29 providing an abutment against which the biasing spring 30 may abut. It will be appreciated that this could be modified to mount the biasing spring in a similar way to that previously described, if so desired. An arm 31 projects forwardly from the pulling dog 27 and has a slot 32 extending in from the end thereof. An arm also extends from the next link in the chain with this arm 33 having a pin 34 protruding therefrom which in use engages in the slot 32.

An L-shaped abutment arm 35 is provided to extend over the rail 2 with the angle in the member 35 arranged to abut against part of the carriers. A rearward extension 33a of the arm 33 protrudes beyond the top of the member 29 to coact with station attachments as shown at 36.

The arms 33 and 31 thus together provide interconnecting link arms connecting the abutment arm to the pulling dog so that in use the pulling dog is connected to move in sympathy with the abutment arm. Additional intermediate linking arms may be pivotally mounted on the chain and arranged with a lost motion connection between the separately pivotal arms, the lost motion preferably being provided by the slot pin connection above described as illustrated in the drawings. By way of example the spacing between the abutment arm and pulling dog on the construction as illustrated in the drawings may be increased two further links in the chain by pivotally mounting intermediate link arms on the intermediate joints of the chain, the intermediate link arm arranged in line one with the other and have the lost motion connection similar to that already shown. In this way the spacing between the pulling dog and the abutment arm may be adjusted. This spacing controls the distance at which the carriers are spaced along the conveyor rail.

The carriers 37 and 37a may be any suitable carrier but arranged with an abutment member or plate to coact with the abutment arm of the driving member. Various shapes of abutment plates may be provided attached to the top of the carrier. Plates may extend in either side of the carrier and of course the lengths thereof will assist in controlling the spacing between stacked carriers. For example, a crescent-shaped abutment plate 38 may be attached to the top of a carrier with the concave face of the crescent directed inwardly to engage with the abutment arm 35 so that upon the abutment arm coacting with the carrier 37a the carrier 37 will be released from the pulling dog 27. Also if the protuberance 33a coacts with the station 36 this will cause the dog to release the carrier 37a.

In a conveyor system it is frequently desirable to remove a carrier and the load supported thereby from the main conveyor rail. To this end a feed-off switch 39 is provided. It is preferable for such a switch to be arranged so that it may in one position engage with and remove a carrier from the conveyor rail 2 and in another position allow the carrier on the conveyor rail to pass without being removed. Such a feed-off switch is illustrated in FIGURES 8 and 9 of the accompanying drawings. The main portion 40 of the feed-off switch is suitably supported from a structural member 41 and has a pivotally mounted end head 42 which in the position as illustrated in the accompanying drawings engages with the rail 2 to enable a carrier to be moved to a position to slide down the feed-off rail 40. In another position the head 42 may be pivoted upwardly so that it is clear from the rail 2. The head 42 is pivotally mounted on an L-shaped arm 43 pivoted at 44 with an adjustable operating lever 45 having a cam head operable when moved along the face 46 of the member 43 to raise the head 42. This shows a manual operation but it will be clear it may readily be mechanised if this proves to be desirable.

The forward end of the member 42 is shaped to extend down into engagement with the top of the rail 2 with a section 48 of the rail 2 removed and a protruding tongue 49 extending into the removed portion and below the upper surface of the rail 2. In this way when any carrier, for example, carrying skids normally used in the freezing industry, are passed along the rail 2 they may readily be moved over the end 47 of the member 42. The carrier will tend to ride up the end 47 and also will ride up the inclined face 50 on the protuberance 22 extending from the end of the driving member. Thus the driving dog can raise the carrier to a position where it is turned down the inclined portion of the head member 42 and on to the feed-off rail 40.

It will also be appreciated that where only one feed-off switch is illustrated in the accompanying drawings any number of feed-off switches may be so provided, thus allowing for a selective distribution of the carriers and articles supported thereby on to the respective feed-off rails.

It is also important to provide an automatic feed-on switch 51 so that loaded carriers may be introduced on to the conveyor rail 2. This feed-on switch is illustrated in greater detail in FIGURES 11 and 12 of the accompanying drawings. A suitably supported and fixed inclined section of rail 52 has a pivotal head portion 53 associated with the end thereof. The head portion 53 is normally biased to the upper position as illustrated in the drawings, but can pivot downwardly into contact with the conveyor rail 2 upon a loaded carrier passing on to the head 53. A pivotal mounting member 54 is provided to support the head 53 which has the end portion of the rail 55 turned at right angles to contact with the top of the rail 2 when in the lower position. Extending from the opposite side of the head 53 is a release guard 56 which extends over the rail 2 to coact initially with the arm 21 on the driving member so that if a driving dog is passing the feed-on switch when a further carrier is to be introduced on to the main conveyor rail the release guard 56 releases the driving member from the carrier, thus preventing the possibility of the newly fed-on carrier landing on top of a carrier alrady being moved along the main conveyor rail.

A weighted lever 57 ensures the head 53 is returned to the upper position when the carrier has been fed on to the main conveyor rail. A stop 58 arrests this movement with the head 53 in line with the remaining inclination of the rail. A V'ed indentation and protuberance 59 again ensures the carrier may be passed easily from the rail on to the head 53. A further stop not shown in the drawings can be provided if desired, to prevent a loaded carrier passing down the rail 52 when the head has pivoted to a position to deliver a carrier on to the conveyor rail 2. However it is possible to feed a plurality of carriers into the conveyor at one time, if so desired.

If so desired a section of the conveyor may be provided along which the driving members 12 are positioned to remain in positive engagement with the carriers. Such a section of rail could for example be provided where it was desired to move the conveyor rail down or up a slope. To this end a retaining member 60 is provided extending out from the back of the angle member 4. The member 60 may be permanently fixed in place or may be releasably attached to the member 4 as desired. The ends are returned inwardly towards the member 4 and in use when the driving member 12 passes the member 60 the pin 19 engages about the outer surface thereof. In this position it is not now possible for the driving dog to pivot and release the carrier or for the carrier for any reason to overrun the driving member.

It is also necessary to have a release station preferably one which can be moved to an operative or inoperative position at will. A release station 61 is shown in FIGURE 2 and in greater detail in FIGURES 13 and 14. It will be appreciated that any number of release stations may be provided around the conveyor rail. The object of the release station is to provide a point at which the driving members will automatically release the carriers, for example so that the articles being carried thereby may be treated or removed. The release station 61 preferably comprises a pivotal ramp member 62 operable to move to a position as shown in FIGURE 14 so that it will engage the pin 19 and cause the driving member to release the carrier. The member 62 is pivotally mounted on a support member 63 so that it can be moved from the operable position where it is held by the transverse bar 64 engaging in the notch 65 to the released inoperative position as illustrated in FIGURE 13.

It will be appreciated that a conveyor system according to the present invention has many uses. For example, the conveyor rail with suitable loading removal stations provided may be used in bagging coal and conveying the bags of coal to a storage floor. Also the invention in the form illustrated has particular application in the freezing industry where carcasses supported on carriers may be fed on to the conveyor rail by any of a number of feed-on switches 51. The carcasses may then be conveyed about the conveyor rail and delivered therefrom on to a selected feed-off switch so that the carcasses are sorted as they are delivered from the conveyor rail.

Also the conveyor may be used for industrial purposes to convey loads along an assembly line. In this instance, by arranging the appropriate dummy carriers and spacing links to be associated with the size of article to be conveyed the article may be moved about the conveying system for treatment at various stations with units marshalled or stacked behind the unit being treated at appropriate spaces depending upon the size of article supported by the carrier.

What I claim is:

1. Conveyor apparatus comprising a conveyor path, a plurality of carriers arranged to move along said conveyor path, a continuous drive means rotatably driven so that at least part of the path of the drive means follows said conveyor path, at least one driving member pivotally connected to said driving means, said driving member comprising in turn an arm pivotally connected to the driving means to pivotally move in a horizontal plane, said arm in use trailing from the point of connection to the drive means, a pulling dog adjacent the end of said arm arranged to engage a carrier on said conveyor path, a cam face on said pivotal arm between the point of connection to the drive means and the pulling dog, said cam face being positioned to engage with any stationary carrier upon the conveyor path to pivot said driving member away from the conveyor path and disengage the pulling dog from any carrier being propelled along said conveyor path by said driving member, a release station associated with said conveyor path on the side of the driving means remote from the conveyor path, a control arm associated with said driving member and protruding so part thereof will engage said release station as the driving means is moved about the conveyor path to pivot said driving member away from the conveyor path and disengage the pulling dog from any carrier being propelled along said conveying path by said driving member, and biasing means biasing said driving member to a position with the pulling dog adapted to engage any carrier on said conveyor path, the construction and arrangement being such that upon the control arm of the driving member propelling a carrier engaging with said release station, said carrier is released and subsequent carriers propelled by the first driving member or other driving members provided on the driving means selectively release carriers being propelled thereby upon the cam face of the driving member coacting with the preceding stationary carrier on the conveyor path.

2. The conveyor apparatus as claimed in claim 1 in which a plurality of release stations are provided about the conveyor path and each said release station is pivotally mounted to move from a position arranged to engage with the control arm associated with each drive member to a disengaged position where the control arm of the drive means may pass without contacting said release station.

3. The conveyor apparatus as claimed in claim 2 in which said conveying path is a continuous conveying path with said endless drive means positioned on the inside of said conveyor path.

4. The conveyor apparatus as claimed in claim 3 in which the conveying path comprises a conveying rail defined by a rectangular metal member mounted in use in a vertical position with one of the shorter sides of the rectangle providing a bearing surface of the rail and a channel member parallel to but spaced a short distance apart from the inside of the conveyor rail and said drive means comprises an endless chain operable to move in said channel member positioned on the inside of the conveyor rail.

5. The conveyor apparatus as claimed in claim 4 including adjustable spacing means to enable carriers to be marshalled selectively on the conveyor path with the spacing between marshalled carriers dependent upon the adjustable spacing means.

6. The conveyor apparatus as claimed in claim 5 in which said adjustable spacing means comprise one or a plurality of dummy carriers extending rearwardly from the load bearing carrier and spacing links connecting said dummy carrier at fixed distances apart so that in use the driving member can only engage with the load bearing carrier.

7. Conveyor apparatus comprising a conveyor rail, a continuous drive means rotatably driven so that at least part of the path of the drive means follows said conveyor rail, at least one driving member drivably attached to said driving means to move along adjacent said conveyor rail, at least one release station associated with said conveyor rail, a plurality of carriers mounted to be moved along said conveyor rail in turn by said driving member, an abutment means incorporated or associated with said driving member before the propelling part of said driving member to cause said driving member to disengage any carrier being propelled thereby upon the abutment part of said driving member contacting a part of the preceding carrier or said release station, biasing means to bias said diving member to a position to engage with said carrier on said conveyor rail and adjustable spacing means incorporated or associated with said carriers or driving members to enable the carriers to be marshalled selectively on the conveyor rail with the spacing between the marshalled carriers dependent upon said adjustable spacing means, comprising one or a plurality of dummy carriers extending rearwardly from the load bearing carriers and spacing links connecting said dummy carriers at fixed distances apart so that in use a driving member can engage only with the load bearing carrier, the construction and arrangement being such that upon a driving member propelling a carrier engaging with said release station said carrier is released and subsequent carriers propelled by the first driving member or other driving members provided on the driving means selectively release carriers being propelled thereby upon the abutment means of the driving member coacting with the preceding stationary carrier or the last of the plurality of dummy carriers associated therewith extending rearwardly therefrom with the spacing between carriers dependent upon the number of dummy carriers extending rearwardly from each load bearing carrier.

8. The conveyor apparatus as claimed in claim 7 in which said conveying rail is a continuous conveying rail with said endless drive means positioned on the inside of said conveyor rail.

9. The conveyor apparatus as claimed in claim 7 in which the conveying rail is defined by a rectangular metal member mounted in use in a vertical position with one of the shorter sides of the rectangle provided a bearing surface of the rail and a channel member parallel to but spaced a short distance apart from the inside of the conveyor rail and said drive means comprises an endless chain operable to move in said channel member positioned on the inside of the conveyor rail.

10. Conveyor apparatus comprising a conveyor rail formed from a rectangular metal member mounted in use from a vertical position with one of the shorter sides of the rectangle providing the bearing surface of the rail, a plurality of carriers arranged to move along said conveyor rail, a continuous drive chain rotatably driven so that at least part of the path of the drive chain follows the conveyor rail, a channel member parallel to but spaced a short distance apart from the inside of the conveyor rail in which said drive chain moves, at least one driving member pivotally connected to said driving chain, said driving member comprising in turn an arm pivotally connected to the driving means to pivotally move in a horizontal plane with said arm in use trailing from the point of connection to the driving chain, a pulling dog adjacent the end of said arm arranged to engage with a carrier on said conveyor rail, a cam face on said pivotal arm between the point of connection to the drive chain and the pulling dog, said cam face being positioned to engage with any stationary carrier upon said conveyor rail to pivot the driving member away from the conveyor rail and disengage the pulling dog from any carrier being propelled along said conveyor rail by said driving member, a release station associated with said conveyor rail on the side of the driving chain remote from the conveyor rail, said release station being pivotally mounted to move from an operative to an inoperative position, a control means associated with said driving member and protruding so that part thereof will engage with said release station when in the operative position as the driving member is moved about the conveyor rail to pivot the driving member away from the conveyor rail and disengage the pulling dog from any carrier being propelled along the conveyor rail by said driving member, biasing means to bias the driving member to a position with the pulling dog being adapted to bear against the side of the conveyor rail and engage any carrier supported therefrom, and adjustable spacing means incorporated with said driving means to enable the carriers to be marshalled selectively on the conveyor rail with the spacing between the marshalled carriers dependent upon said adjustable spacing means, said adjustable spacing means comprising in turn an abutment arm pivotally mounted on said driving chain in front of said pulling dog and interconnecting link arms connecting said abutment arm to said pulling dog so that in use said pulling dog was connected to move in sympathy with said abutment arm, said interconnecting link arms being pivotally mounted on said chain and arranged with a lost motion connection between separate pivotal links with said control means operatively associated with said interconnecting links to engage with the release station when in the operative position, the construction and arrangement being such that upon the control means of the driving member propelling a carrier engaging with the release station, said carrier being propelled thereby is released and subsequent carriers propelled by the first driving member or other driving members provided on the driving chain selectively release carriers being propelled thereby upon the abutment arm of the driving member coacting with the preceding stationary carrier on the conveyor rail.

References Cited

UNITED STATES PATENTS

| 2,383,835 | 8/1945  | Ackerman | 104—89  |
| 2,949,862 | 8/1960  | Klamp    | 104—170 |
| 3,065,714 | 11/1962 | Orwin    | 104—88  |
| 3,088,419 | 5/1963  | Bishop   | 104—172 |
| 3,257,963 | 6/1966  | King     | 104—96  |

ARTHUR L. LA POINT, *Primary Examiner.*

D. F. WORTH, *Assistant Examiner.*

U.S. Cl. X.R.

104—178